US012580229B2

(12) United States Patent
Kim et al.

(10) Patent No.: US 12,580,229 B2
(45) Date of Patent: Mar. 17, 2026

(54) UNIT CELL INCLUDING THERMOCHROMIC POLYMER AND DEFECT DETECTION METHOD USING THE SAME

(71) Applicant: LG ENERGY SOLUTION, LTD., Seoul (KR)

(72) Inventors: Soo Jung Kim, Daejeon (KR); Duk Hyun Ryu, Daejeon (KR); Min Gi Jeong, Daejeon (KR); Han Saem Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 650 days.

(21) Appl. No.: 17/913,047

(22) PCT Filed: Aug. 20, 2021

(86) PCT No.: PCT/KR2021/011122
§ 371 (c)(1),
(2) Date: Sep. 20, 2022

(87) PCT Pub. No.: WO2022/039553
PCT Pub. Date: Feb. 24, 2022

(65) Prior Publication Data
US 2023/0216092 A1 Jul. 6, 2023

(30) Foreign Application Priority Data
Aug. 20, 2020 (KR) ........................ 10-2020-0104833

(51) Int. Cl.
| | |
|---|---|
| *H01M 10/42* | (2006.01) |
| *G01K 11/12* | (2021.01) |
| *H01M 10/48* | (2006.01) |
| *H01M 50/423* | (2021.01) |
| *H01M 50/449* | (2021.01) |
| *H01M 50/489* | (2021.01) |

(52) U.S. Cl.
CPC ..... *H01M 10/4235* (2013.01); *H01M 10/488* (2013.01); *H01M 50/423* (2021.01); *H01M 50/449* (2021.01); *H01M 50/489* (2021.01); *G01K 11/12* (2013.01); *H01M 2200/10* (2013.01)

(58) Field of Classification Search
None
See application file for complete search history.

(56) References Cited

U.S. PATENT DOCUMENTS

| | | | |
|---|---|---|---|
| 2006/0008699 A1 | 1/2006 | Um | |
| 2006/0246292 A1 | 11/2006 | Seeboth et al. | |
| 2013/0029242 A1 | 1/2013 | Mizuhata et al. | |
| 2014/0294707 A1 | 10/2014 | Hoshino et al. | |
| 2015/0107774 A1 | 4/2015 | Lee | |
| 2017/0047559 A1* | 2/2017 | Yoo | H01M 50/119 |
| 2017/0309916 A1 | 10/2017 | Toyoda et al. | |
| 2018/0287138 A1 | 10/2018 | Miura | |
| 2019/0070555 A1 | 3/2019 | Hoshino et al. | |
| 2019/0240617 A1 | 8/2019 | Hoshino et al. | |
| 2019/0260066 A1 | 8/2019 | Hu et al. | |
| 2019/0356020 A1 | 11/2019 | Zhi et al. | |
| 2020/0395642 A1 | 12/2020 | Hwang | |

FOREIGN PATENT DOCUMENTS

| | | |
|---|---|---|
| CA | 2 870 982 A1 | 1/2015 |
| CN | 1722510 A | 1/2006 |
| CN | 1835997 A | 9/2006 |
| CN | 202405389 U | 8/2012 |
| CN | 102947992 A | 2/2013 |
| CN | 205303520 U | 6/2016 |
| CN | 106543380 A | 3/2017 |
| CN | 206451753 U | 8/2017 |
| CN | 107317056 B | 8/2019 |
| CN | 111399260 A | 7/2020 |
| GB | 2 312 955 A | 11/1997 |
| JP | 10-268008 A | 10/1996 |
| JP | 9-7577 A | 1/1997 |
| JP | 2002334689 A * | 11/2002 |
| JP | 2006-12825 A | 1/2006 |
| JP | 2006-57293 A | 3/2006 |
| JP | 2006-179433 A | 7/2006 |
| JP | 2008-99667 A | 5/2008 |
| JP | 4545300 B2 | 9/2010 |
| JP | 2010-244943 A | 10/2010 |

(Continued)

OTHER PUBLICATIONS

Thermochromism, available online at https://en.wikipedia.org/wiki/Thermochromism, date unknown.*
Jian, H, Emmett, R.K., Roberts, M. E.—Building thermally stable supercapacitors using temperature-responsive separators, Journal of Applied Electrochemistry (2019), 49, pp. 271-28. (Year: 2019).*
Zhu, J., Yao, M., Huang, S., Tian, J., Niu, Z.—Thermal-Gated Polymer Electrolytes for Smart Zin-Ion Batteries, Angew.Chem. Int. 2020, 59, pp. 16480-16484, published on Jun. 16, 2020 (Year: 2020).*

(Continued)

*Primary Examiner* — Anca Eoff
(74) *Attorney, Agent, or Firm* — Birch, Stewart, Kolasch & Birch, LLP

(57) ABSTRACT

A unit cell including a thermochromic polymer and a defect detection method using the same are disclosed. Preferably, the unit cell includes a positive electrode, a negative electrode, and a separator disposed between the positive electrode and the negative electrode, wherein the separator includes a thermochromic polymer configured such that the color of the thermochromic polymer changes depending on temperature, whereby the unit cell is easily checked to indicate a short circuit, as well as damage to or defects of the separator.

8 Claims, 1 Drawing Sheet

(56)            References Cited

FOREIGN PATENT DOCUMENTS

| | | | |
|---|---|---|---|
| JP | 2015-120093 | A | 7/2015 |
| JP | 2015-125882 | A | 7/2015 |
| JP | 2018-46001 | A | 3/2018 |
| JP | 2019-517722 | A | 6/2019 |
| KR | 10-2006-0079188 | A | 7/2006 |
| KR | 10-2017-0085510 | A | 7/2017 |
| KR | 10-2018-0084268 | A | 7/2018 |
| KR | 10-2047011 | B1 | 11/2019 |
| KR | 10-2020-0017089 | A | 2/2020 |

OTHER PUBLICATIONS

Dueramae, I., Okhawilai, M., Kasemsiri, P., Uyama, H., Kita, R.—Properties enhacement of carboxymethyl cellulose with thermo-responsive polymer as solid polymer electrolyte for zinc ion batteries, Sientific Reports, 2020, 10:12587 (Year: 2020).*

Machine translation of JP2002-334689A, published in Nov. 22, 2002 (Year: 2002).*

Extended European Search Report for European Application No. 21856640.2, dated Jul. 29, 2024.

International Search Report for PCT/KR2021/011122 (PCT/ISA/210) mailed on Nov. 26, 2021.

Ji et al., "Temperature-responsive microspheres-coated separator for thermal shutdown protection of lithium ion batteries", RSC Adv. 2015, Nov. 21, 2014, vol. 5, No. 172, pp. 172-176.

* cited by examiner

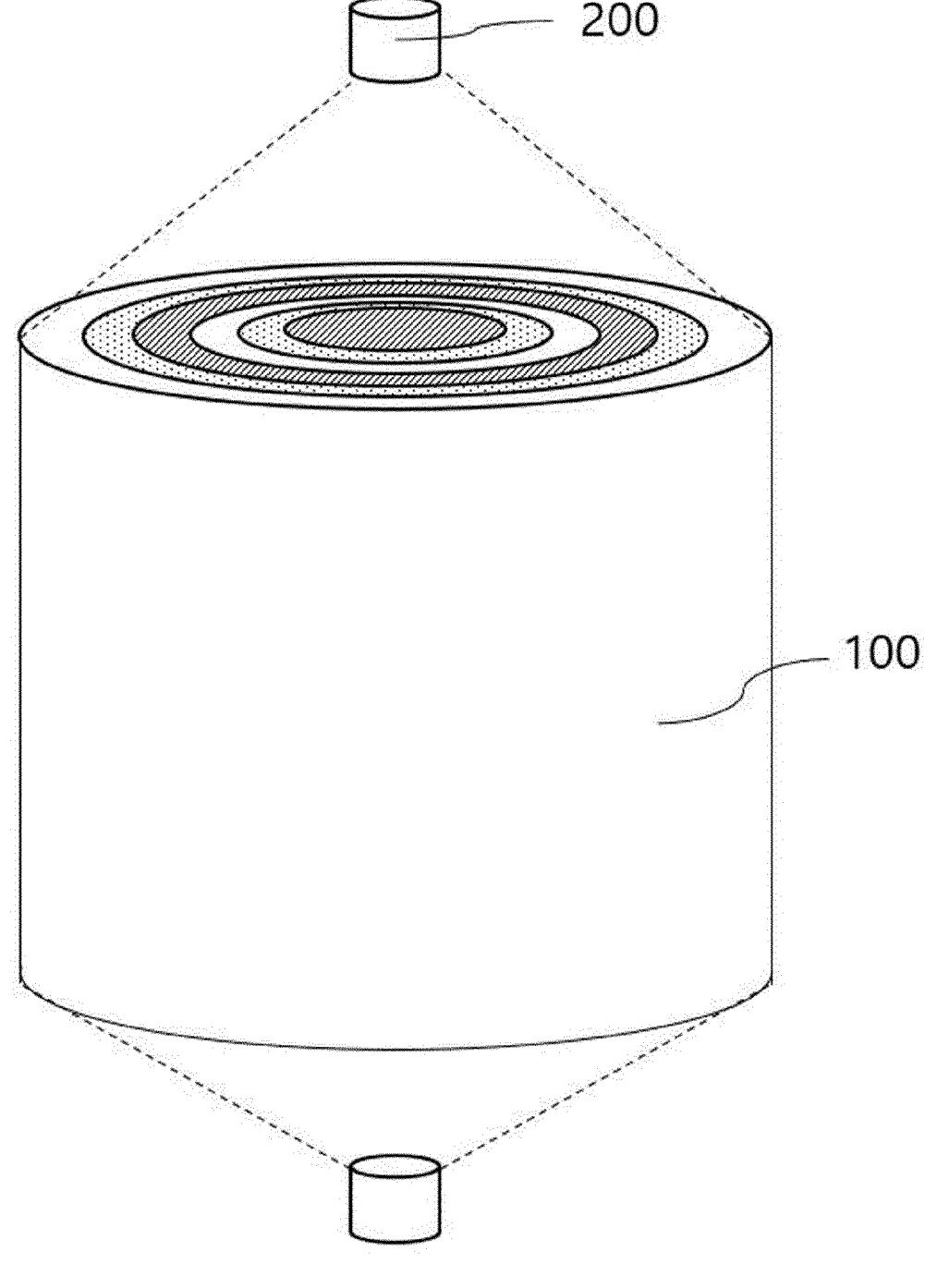

UNIT CELL INCLUDING THERMOCHROMIC POLYMER AND DEFECT DETECTION METHOD USING THE SAME

TECHNICAL FIELD

This application is a National Stage under 35 USC 371 of the International Application No. PCT/KR2021/011122, filed Aug. 20, 2021, which claims priority to Korean Patent Application No. 10-2020-0104833 filed on Aug. 20, 2020, the disclosure of which is incorporated herein by reference in its entirety.

The present invention relates to a unit cell including a thermochromic polymer and a defect detection method using the same. More particularly, the present invention relates to a unit cell including a positive electrode, a negative electrode, and a separator disposed between the positive electrode and the negative electrode, wherein the separator includes a thermochromic polymer configured such that the color of the thermochromic polymer is changed depending on temperature.

BACKGROUND ART

In recent years, a battery cell capable of being charged and discharged has been widely used as an energy source for wireless mobile devices. In addition, a secondary battery has attracted attention as a power source for electric vehicles (EV), hybrid electric vehicles (HEV), and plug-in hybrid electric vehicles (Plug-In HEV) presented as alternatives to existing gasoline and diesel vehicles using fossil fuels, which cause air pollution. Furthermore, the secondary battery has also been used in a high-output power tool, an electric bicycle (E-bike), an electric scooter (E-scooter), an electric golf cart, or an energy storage system.

Depending on the shape of a battery case, the battery cell is classified as a cylindrical battery cell, configured such that an electrode assembly is mounted in a cylindrical metal can, a prismatic battery cell, configured such that an electrode assembly is mounted in a prismatic metal can, or a pouch-shaped battery cell, configured such that an electrode assembly is mounted in a pouch-shaped case made of an aluminum laminate sheet. Thereamong, the cylindrical battery cell has advantages in that the cylindrical battery cell has a relatively large capacity and is structurally stable.

The cylindrical battery cell is manufactured by receiving a jelly-roll type electrode assembly in a cylindrical case together with an electrolytic solution. In general, a positive electrode tab of the jelly-roll type electrode assembly, which protrudes upwards, is coupled to a cap assembly, whereby a top cap serves as a positive electrode terminal, and a negative electrode tab of the jelly-roll type electrode assembly, which protrudes downwards, is coupled to a battery case, whereby the battery case serves as a negative electrode terminal.

The negative electrode tab is attached to the bottom of the battery case by welding. During a welding process, molten metal may be scattered from a welding rod or a wire, or a spattering/splashing phenomenon in which the molten metal is partially melted and stuck or weakly attached to the periphery of the negative electrode tab in a small lump state may occur, whereby the electrode assembly may be defective. In the case in which such a defective electrode assembly is used, performance of the battery may be reduced, or a specific portion of the electrode assembly may overheat, whereby stability of the battery may be reduced.

Conventionally, in order to solve the above problems, a separator is directly observed or analyzed using an SEM or a microscope to check a short circuit portion of the separator, which takes much time. Furthermore, analysis and observation using CT are performed in order to find the short circuit portion, which is inconvenient.

In Non-Patent Document 1, a material configured such that the volume of the material is changed depending on temperature is added to a separator, whereby the shutdown characteristics of the separator are improved while thermal runaway is prevented. However, there are problems in that it is difficult to check defects of a specific portion and that a change in volume of the separator must be measured in order to check a short circuit portion.

Therefore, a construction capable of directly recognizing a short circuit portion in a secondary battery or whether the secondary battery is abnormal in order to improve stability of the battery and to enhance performance of the battery is necessary.

PRIOR ART DOCUMENT (Non-Patent Document 1) *Temperature-responsive micro-spheres-coated separator for thermal shutdown protection of lithium ion batteries* (RSC ADV. 2015, 5, 172) (Weixiao Ji et al.) (2014 Nov. 21)

DISCLOSURE

Technical Problem

The present invention has been made in view of the above problems, and it is an object of the present invention to provide a unit cell configured such that a material configured to indicate short circuit or whether a defect occurs is added to a separator, in which short circuit easily occurs, whereby it is possible to indicate damage to or defects of the separator, and a defect detection method using the same.

Technical Solution

In order to accomplish the above object, the present invention provides a unit cell including a positive electrode, a negative electrode, and a separator disposed between the positive electrode and the negative electrode, wherein the separator includes a thermochromic polymer configured such that the color of the thermochromic polymer is changed depending on temperature.

The separator may include a separator substrate and a coating layer located on at least one surface of the separator substrate, and the coating layer may include the thermochromic polymer.

The coating layer may have a thickness of 1 $\mu$m to 20 $\mu$m.

The thermochromic polymer may be discolored within a range of 60° C. to 120° C.

The thermochromic polymer may be poly(N-isopropylacrylamide) (PNIPAAm).

The thermochromic polymer may be distributed in the surface of the separator substrate or the surface of the coating layer.

The thermochromic polymer may be distributed at a distance of 0 $\mu$m to 2 $\mu$m from the surface of the separator.

The thermochromic polymer may be distributed in the surface that faces the positive electrode and the surface that faces the negative electrode.

In addition, the present invention provides a defect detection method including S1) manufacturing the unit cell, S2)

receiving the unit cell in a case and hermetically sealing the case, S3) checking a change in color of the unit cell, and S4) determining a discolored unit cell to be defective.

In step S3, the change in color of the unit cell may be checked through at least one of ultraviolet measurement or UV spectrum measurement.

Ultraviolet measurement equipment or infrared measurement equipment may be mounted in the case.

In the present invention, one or more constructions that do not conflict with each other may be selected and combined from among the above constructions.

Advantageous Effects

As is apparent from the above description, a unit cell according to the present invention includes a thermochromic polymer configured such that the color of the thermochromic polymer is changed depending on temperature, whereby it is possible to check the position of a metal scattered during welding, and therefore it is possible to detect a defective portion of the unit cell.

In addition, the thermochromic polymer is included in a separator, whereby it is possible to recognize temperature of the separator. Consequently, it is possible to interrupt power supply before short circuit occurs in the separator, and therefore it is possible to improve stability of a battery.

Furthermore, it is possible to clearly indicate a short circuit portion of the separator, whereby it is possible to acquire research data that assists in performing welding or improving performance of the separator afterwards.

In addition, it is possible to indicate a defective portion using color, whereby detection and analysis time is reduced and cost is also reduced.

In addition, it is possible to indicate a defective portion using color, whereby detection and analysis time is reduced and cost is also reduced.

DESCRIPTION OF DRAWINGS

The FIGURE is a schematic view of a defect detection method according to an embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, the present invention will be described with reference to an embodiment. However, the embodiment is provided only for easier understanding of the present invention and should not be construed as limiting the scope of the present invention. Hereinafter, the present invention will be described in more detail.

A unit cell according to the present invention includes a positive electrode, a negative electrode, and a separator disposed between the positive electrode and the negative electrode, wherein the separator includes a thermochromic polymer, the color of which is changed depending on temperature.

Positive Electrode

For example, the positive electrode may be manufactured by applying a positive electrode mixture of a positive electrode active material constituted by positive electrode active material particles, a conductive agent, and a binder to a positive electrode current collector. A filler may be further added to the positive electrode mixture as needed.

In general, the positive electrode current collector is manufactured so as to have a thickness of 3 μm to 500 μm. The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, or titanium. Alternatively, the positive electrode current collector may be made of aluminum or stainless steel, the surface of which is treated with carbon, nickel, titanium, or silver. Specifically, aluminum may be used. The current collector may have a micro-scale uneven pattern formed on the surface thereof so as to increase adhesive force of the positive electrode active material. The current collector may be configured in any of various forms, such as a film, a sheet, a foil, a net, a porous body, a foam body, and a non-woven fabric body.

In addition to the positive electrode active material particles, the positive electrode active material may be constituted, for example, by a layered compound, such as a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; or $Fe_2(MoO_4)_3$. However, the present invention is not limited thereto.

The conductive agent is generally added so that the conductive agent accounts for 0.1 to 30 weight % based on the total weight of the mixture including the positive elec- trode active material. The conductive agent is not particu- larly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; carbon fluoride powder; metallic powder, such as aluminum powder, or nickel powder; con- ductive whisker, such as zinc oxide or potassium titanate; a conductive metal oxide, such as titanium oxide; or a con- ductive material, such as a polyphenylene derivative, may be used as the conductive agent.

The binder, which is included in the positive electrode, is a component assisting in binding between the active material and the conductive agent and in binding with the current collector. The binder is generally added in an amount of 0.1 to 30 weight % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropyl- ene, ethylene-propylene-diene terpolymer (EPDM), sulfonated EPDM, styrene butadiene rubber, fluoro rubber, and various copolymers.

Negative Electrode

The negative electrode may be manufactured by applying a negative electrode active material to a negative electrode current collector and drying the same. The above-described components may be optionally further included as needed.

The negative electrode current collector is generally manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collec- tor may be made of copper, stainless steel, aluminum, nickel, titanium, or sintered carbon. Alternatively, the negative electrode current collector may be made of copper or stain- less steel, the surface of which is treated with carbon, nickel, titanium, or silver, or an aluminum-cadmium alloy. In addi- tion, the negative electrode current collector may have a micro-scale uneven pattern formed on the surface thereof so as to increase the force of binding with the negative elec- trode active material, in the same manner as the positive electrode current collector. The negative electrode current collector may be configured in any of various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 < x \leq 1$; $1 \leq y \leq 3$; $1 \leq z \leq 8$); lithium metal; a lithium alloy; a silicon-based alloy; a tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; a conductive polymer, such as polyacetylene; or a Li—Co—Ni based material.

Separator

The separator according to the present invention may be constituted by only a separator substrate, or may include a coating layer located on at least one surface of the separator substrate.

The thermochromic polymer may be included in at least one of the separator substrate and the coating layer.

Separator Substrate

The separator substrate electrically insulates the positive electrode and the negative electrode from each other, thereby preventing short circuit, and provides a movement path of lithium ions. A porous film having high resistance to an electrolytic solution, which is an organic solvent, and a very small pore diameter may be used. The separator sub- strate is not particularly restricted as long as the separator substrate can generally be used as the material for a sepa- rator of a secondary battery. For example, the separator substrate may include a resin, such as a polyolefin-based resin (polyethylene, polypropylene, polybutene, or polyvi- nyl chloride), or a mixture or copolymer thereof, or may include a resin, such as polyethylene terephthalate, polycy- cloolefin, polyethersulfone, polyamide, polyimide, polyim- ide-amide, polyaramide, nylon, or polytetrafluoroethylene. Thereamong, the polyolefin-based resin is preferably used, since applicability of a slurry for porous coating layers is high and the thickness of a separator for secondary batteries is reduced, whereby the percentage of the electrode active material layer in the battery is increased and thus the capacity per unit volume thereof is increased. More prefer- ably, the separator substrate according to the present inven- tion is polyethylene or polypropylene.

The thickness of the separator substrate may be 1 μm to 100 μm, preferably 1 μm to 30 μm. The pore diameter of the separator substrate may generally be 0.01 μm to 10 μm.

Coating Layer

Although the thickness of the coating layer is not par- ticularly restricted, it is basically preferable for the coating layer to have a sufficient thickness to exhibit a coating layer addition effect while the capacity of the secondary battery is high. In consideration thereof, the thickness of the coating layer according to the present invention may be 1 μm to 20 μm. If the coating layer is thinner than 1 μm, a sufficient amount of thermochromic polymer is not included, whereby it is difficult to indicate a defective portion, which is undesirable. If the coating layer is thicker than 20 μm, it is difficult to accurately recognize the temperature applied to the separator, which is also undesirable.

The coating layer may be located on at least one surface of the separator substrate. In order to accurately recognize the temperature of the separator, it is preferable for the coating layer including the thermochromic polymer accord- ing to the present invention to be located on opposite surfaces of the separator substrate.

Thermochromic Polymer

In the secondary battery according to the present inven- tion, the thermochromic polymer may be included in the separator substrate or in the coating layer located on at least one surface of the separator substrate. Any thermochromic polymer may be used as long as the color of the thermochro- mic polymer is changed by heat while not affecting perfor- mance of the battery. The thermochromic polymer may be reversibly or irreversibly discolored. In the case in which a thermochromic polymer configured to be reversibly discol- ored is used, a change in color of the separator may be sensed such that the use of the battery is interrupted at a specific temperature or higher, and the battery may be used again when the color of the separator is restored.

In the case in which a thermochromic polymer configured to be irreversibly discolored is used, it is possible to confirm an overheating portion of the discolored separator, whereby it is possible to clearly recognize a problematic portion.

The thermochromic polymer may be poly(N-isopropylacrylamide) (PNIPAAm). In addition, the thermochromic polymer may be manufactured by adding a thermochromic dye, such as a triphenylmethane colorant, pyridinium phenolate betaine, sulfonephthalein, Reichardt's dye, thyronine, an indicator colorant, an azo pigment, or a fluoran colorant, e.g. 2-chloro-6-dimethylamino-3-methylfluoran, to a polymer, such as polyethylene, polypropylene, polyester, polyamide and/or acrylonitrile-butadiene-styrene-copolymer.

At least one thermochromic polymer may be included in the separator substrate or the coating layer. The reason for this is that various colors are exhibited depending on a change in temperature of the separator substrate or the coating layer, whereby it is possible to determine whether the battery is abnormal based on temperature.

The thermochromic polymer may be discolored within a range of 60° C. to 120° C. Since the above temperature range is set based on the temperature higher than normal operation temperature of the battery cell and the temperature immediately before heat is generated from the battery, the temperature may be changed depending on environments in which the battery is used.

In addition, the thermochromic polymer may be configured to exhibit different colors depending on the position of the separator substrate. In the case in which the thermochromic polymer is configured to exhibit different colors depending on the position of the separator substrate, as described above, it is possible to check whether the separator is abnormal simply by detecting a change in color having a specific wavelength through laser irradiation without separation of the separator.

The thermochromic polymer may be distributed in the surface of the separator substrate or the surface of the coating layer. The thermochromic polymer may be distributed at a distance of 0 μm to 2 μm from the surface of the separator substrate or the surface of the coating layer. The surface of the separator substrate or the surface of the coating layer may mean the entire outer surface of the separator substrate or the coating layer that comes in contact with the outside or a portion thereof. In the case in which the thermochromic polymer is located in the surface of the separator substrate or the surface of the coating layer, as described above, it is possible to more rapidly sense a change in color of the thermochromic polymer and to rapidly recognize heat applied to the separator through the thermochromic polymer, and therefore it is possible to more rapidly recognize shrinkage of the separator or short circuit of the separator.

In addition, the thermochromic polymer according to the present invention may be distributed in the surface that faces the positive electrode and the surface that faces the negative electrode. The reason for this is that, in the case in which the separator, which isolates the positive electrode and the negative electrode from each other, is defective, it is possible to rapidly recognize the same and to solve the problem.

The separator substrate or the coating layer according to the present invention may further include a wavelength conversion material in addition to the thermochromic polymer.

Preferably, the wavelength conversion material is a phosphorescent material including nanomaterials, such as quantum dots, and phosphor. Although another material may be used depending on a detection means, a fluorescent material is preferably used as the wavelength conversion material.

Inorganic Material

In addition to the thermochromic polymer, an inorganic material may be further included in the coating layer in order to increase mechanical strength of the separator. The inorganic material is not particularly restricted as long as the inorganic material provides a uniform thickness to the coating layer and does not undergo oxidation and/or reduction within an operation voltage range of a secondary battery to which the present invention is applied. Particularly, in the case in which inorganic particles having ion transfer ability are used, ionic conductivity of an electrochemical device may be improved, whereby performance of the battery may be improved. Also, in the case in which inorganic particles having high permittivity are used as the inorganic particles, the degree of dissociation of electrolyte salt, e.g. lithium salt, in a liquid electrolyte may be increased, whereby ionic conductivity of the electrolytic solution may be improved.

An example of the inorganic material may be an inorganic material having at least one of lithium ion transfer ability, piezoelectricity, and flame retardancy.

The inorganic material having high lithium ion transfer ability refers to an inorganic material that contains a lithium element but moves lithium ions without storage of lithium. Since the inorganic material having lithium ion transfer ability is capable of transferring and moving lithium ions due to a kind of defect present in a particle structure thereof, lithium ion conductivity in the battery may be improved, whereby performance of the battery may be improved.

The inorganic material having lithium ion transfer ability may be, for example, at least one selected from the group consisting of lithium phosphate, lithium titanium phosphate, lithium aluminum titanium phosphate, $(LiAlTiP)_xO_y$-based glass, lithium lanthanum titanate, lithium germanium thiophosphate, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, $P_2S_5$-based glass ($Li_xP_yS_z$, $0<x<3$, $0<y<3$, $0<z<7$), such as $LiI$—$Li_2S$—$P_2S_5$, and a mixture thereof. However, the present invention is not limited thereto.

The inorganic material having piezoelectricity, which means a material that is a nonconductor at atmospheric pressure but has a physical property, such as electrical conduction, due to a change in internal structure thereof when predetermined pressure is applied thereto, is a material that has a permittivity constant of 100 or more, i.e. high permittivity, and is configured such that one surface thereof is charged with positive electricity while the other surface thereof is charged with negative electricity when predetermined pressure is applied thereto so as to be tensed or compressed, whereby potential difference is generated between the opposite surfaces thereof.

In the case in which the inorganic material having the above characteristics is used, when internal short circuit occurs between both electrodes due to external impact caused by local crush, a nail, etc., the positive electrode and the negative electrode do not directly contact each other due to the inorganic particles formed on the separator by coating, and a potential difference is generated in the inorganic particles due to piezoelectricity of the inorganic particles, whereby electrons move between both electrodes, i.e. microcurrent flows therebetween, and therefore voltage of the battery is slowly reduced and thus safety of the battery is improved.

The inorganic particles having piezoelectricity may be, for example, $BaTiO_3$, $Pb(Zr,Ti)O_3$ (PZT), $Pb_{1-x}La_x Zr_{1-y}Ti_yO_3$ (PLZT), $Pb(Mg_{1/3}Nb_{2/3})O_3$—$PbTiO_3$ (PMN-PT), hafnia ($HfO_2$), or a mixture thereof. However, the present invention is not limited thereto.

The flame-retardant inorganic material may be at least one selected from the group consisting of an antimony-containing compound, a metal hydroxide or metal hydrate, a guanidine-based compound, a boron-containing compound, and a zinc stannate compound.

The antimony-containing compound is one selected from among antimony trioxide ($Sb_2O_3$), antimony tetroxide ($Sb_2O_4$), and antimony pentoxide ($Sb_2O_5$). The metal hydroxide or the metal hydrate is one selected from among aluminum hydroxide ($Al(OH)_3$), aluminum oxyhydroxide ($AlO(OH)$), and $CaO\cdot Al_2O_3\cdot 6H_2O$, excluding magnesium hydroxide ($Mg(OH)_2$). The guanidine-based compound is one selected from among guanidine nitrate, guanidine sulfamate, guanidine phosphate, and guanylurea phosphate. The boron-containing compound is $H_3BO_3$ or $HBO_2$. The zinc stannate compound is one selected from among $Zn_2SnO_4$, $ZnSnO_3$, and $ZnSn(OH)_6$.

Preferably, the flame-retardant inorganic material is at least one selected from among magnesium hydroxide ($Mg(OH)_2$), aluminum hydroxide ($Al(OH)_3$), aluminum oxyhydroxide ($AlO(OH)$), and $CaO\cdot Al_2O_3\cdot 6H_2O$.

As the result of adding the flame-retardant inorganic material, it is possible to prevent overcharging, to add flame retardant characteristics to the separator, or to prevent an abrupt increase in temperature of the battery. Among the flame-retardant inorganic materials according to the present invention, the metal hydroxide is decomposed as dehydration reaction, which is an endothermic reaction, occurs with an increase in temperature. At this time, an additional flame retardant effect may be obtained due to the endothermic reaction and generated water.

In order to improve flame retardancy of the flame-retardant inorganic material, a flame-retardant synergist may be further included. The flame-retardant synergist may be a silicon-based additive, zinc oxide, tin oxide, a nickel compound, zinc borate, a melamine compound, or a mixture of two or more thereof.

The flame-retardant synergist may be used in various combinations depending on the characteristics of the flame-retardant inorganic material. A flame-retardant synergist other than the flame-retardant synergist mentioned above may be further included as a material capable of improving efficiency of the flame-retardant inorganic material. In addition, halogen may be further added, or phosphorous or a phosphorous compound may also be added. The flame-retardant synergist may be provided to the extent to which it is possible to improve efficiency of the flame-retardant inorganic material. The flame-retardant synergist may be added so as to account for 0.001 times to 0.1 times the total weight of the flame-retardant inorganic material.

In addition, an absorbent configured to absorb water molecules generated from the flame-retardant inorganic material; however the absorbent is limited to a material that does not reduce performance of the battery. Any of ordinary materials may be used without limitation as the absorbent. For example, zeolite, porous silica, or porous alumina may be used. However, the present invention is not limited thereto.

Although the particle size of the inorganic material is not particularly restricted, D50 may have a range of 20 nm to 10 μm, specifically 100 nm to 1 μm, in consideration of the purpose to form a coating layer having a uniform thickness and to provide appropriate porosity.

In a particle size distribution curve of particles, D50 means the particle size of particles equivalent to 50% of the accumulated number of particles, and the average particle size of the inorganic particles was measured using a Particle Size Analyzer (Product Name: MASTERSIZER 3000; Manufacturer: Malvern).

The inorganic material may be included so as to account for 10 weight % to 99 weight % based on the weight of the entire solid content of the coating layer. If the content of the inorganic material is less than 10 weight %, it is difficult to achieve an effect that can be obtained as the result of addition of the inorganic material, which is undesirable. If the content of the inorganic material is greater than 99 weight %, the content of the binder is too small, whereby the force of adhesion between the inorganic particles may be reduced, and therefore the inorganic coating layer may be separated from the separator substrate or an uncoated region may be generated at the time of coating, which is also undesirable.

The coating layer may further include a binder in addition to the inorganic material. The inorganic material may be uniformly distributed in the coating layer together with the binder. Since the inorganic material is uniformly distributed in the binder, resistance in the secondary battery may be uniformly formed, whereby occurrence of short circuit at a specific portion may be prevented.

The binder is commonly called a polymer binder, and may have a feature in that the binder gels at the time of impregnation of a liquid electrolytic solution, thereby exhibiting high electrolytic solution impregnability. In practice, in the case in which the binder polymer is a polymer having high electrolytic solution impregnability, the polymer may be impregnated with an electrolytic solution injected after assembly of the battery, the polymer having the electrolytic solution absorbed thereinto exhibits electrolyte ion conduction ability. In addition, wettability with respect to an electrolytic solution for batteries is improved, compared to a conventional hydrophobic polyolefin-based separator, and application of a polar electrolytic solution for batteries, which is conventionally difficult to use, is also possible. If possible, therefore, it is preferable for the polymer to have a solubility index of 15 to 45 $MPa^{1/2}$, more preferably 15 to 25 $MPa^{1/2}$ and 30 to 45 $MPa^{1/2}$. If the solubility index is less than 15 $MPa^{1/2}$ and greater than 45 $MPa^{1/2}$, it is difficult to achieve impregnation by an ordinary liquid electrolytic solution for batteries.

Specifically, the binder is at least one selected from the group consisting of polyvinylidene fluoride (PVdF), poly-vinylidene fluoride-co-hexafluoropropylene, polyvinylpyr-rolidone, polyacrylonitrile, polyvinylidene fluoride-co-trichloroethylene, polyvinylidene fluoride-co-chlorotrifluoroethylene (PVdF-CTFE), polymethyl methacrylate, polyvinyl acetate, an ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile butadiene styrene copolymer, polyimide, a polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), fluoro rubber, and polyimide. Preferably, the binder is at least one selected from the group consisting of PVdF, TFE, and polyimide.

The binder material may further include at least one of baicalin, luteolin, taxifolin, myricetin, quercetin, rutin, catechin, epigallocatechin gallate, butein, piceatannol, a phenol-based compound including tannic acid, pyrogallic acid, amylase, amylopectin, xanthan gum, and a fatty acid-based aqueous or non-aqueous polymer. This binder material includes a large amount of OH groups, whereby the force of adhesion between the binder and the inorganic material and between the substrate and the binder is increased, internal short circuit is prevented through a self-healing function with respect to damage to a portion of the separator, the force of adhesion between the separator and the positive electrode and between the separator and the negative electrode is increased, and elution of a transition metal of the positive electrode is prevented.

Dispersant

The coating layer may further include a dispersant in order to further improve dispersibility of the inorganic material including the thermochromic polymer. The dispersant serves to maintain the state in which the thermochromic polymer is uniformly dispersed in the binder at the time of manufacturing a coating layer slurry. For example, an anionic surfactant may be used in order to maintain uniform dispersion while increasing dispersibility.

An anionic component containing at least one selected from the group consisting of carboxylate, phosphate, sulfonate, and sulfate may constitute a head portion of the anionic surfactant. Thereamong, sulfonate is preferably used as the head portion of the anionic surfactant.

A material having properties of a non-ionic surfactant may be used as a tail portion of the anionic surfactant. Although the material having properties of the non-ionic surfactant is not particularly restricted, a material including an alkyl group may be used. The material including the alkyl group may be polyalkylene oxide having 5 to 200 alkylene oxide repeat units. At this time, polyalkylene oxide may be at least one selected from the group consisting of polyethylene oxide, polypropylene oxide, and a polyethylene oxide-polypropylene oxide copolymer.

A typical example of the anionic surfactant is carboxyl methyl cellulose (CMC).

In addition, at least one selected from among oil-soluble polyamine, an oil-soluble amine compound, fatty acid, fatty alcohol, sorbitan fatty acid ester, tannic acid, and pyrogallic acid may be used as the dispersant.

The content of the dispersant may be 0.2 parts by weight to 10 parts by weight based on 100 parts by weight of the inorganic material. If the dispersant is included so as to account for less than 0.2 parts by weight based on 100 parts by weight of the inorganic material, the inorganic material may be easily precipitated. If the dispersant is included so as to account for greater than 10 parts by weight based on 100 parts by weight of the inorganic material, the force of adhesion of the coating to the separator substrate may be reduced or impurities may be generated as the result of reaction with the electrolytic solution at the time of manufacturing the secondary battery.

Defect Detection Method

A defect detection method according to the present invention may include S1) a step of manufacturing the above unit cell, S2) a step of receiving the unit cell in a case and hermetically sealing the case, S3) a step of checking a change in color of the unit cell, and S4) a step of determining a discolored unit cell to be defective.

In step S3), the change in color of the unit cell may be detected through ultraviolet measurement, through infrared measurement, or with the naked eye.

The ultraviolet measurement or the infrared measurement may be performed using a measurement device mounted in the case. The FIGURE is a schematic view of a defect detection method according to an embodiment of the present invention, and is a schematic view of an ultraviolet measurement or UV spectrum method.

As shown in the FIGURE, the defect detection method according to the present invention may be performed using a detection apparatus 200, such as a silicon diode or a UV spectrometer, disposed in the vicinity of at least one of the upper part and the lower part of a cylindrical secondary battery 100 using the unit cell according to the present invention. The defect detection method according to the present invention may be performed by applying infrared light or ultraviolet light to the separator without disassembly of the cylindrical secondary battery 100. The infrared light or ultraviolet light passes through the separator of the cylindrical secondary battery 100, discoloration of the separator is detected, and whether the secondary battery is abnormal is reported to the outside. The detection apparatus 200 may be connected to a battery management module, and the use of the secondary battery may be interrupted when the secondary battery is abnormal.

In addition, the defect detection method may be used for various other batteries, such as a pouch-shaped secondary battery and a prismatic secondary battery, in addition to the cylindrical secondary battery 100 using the unit cell according to the present invention.

In addition, the defect detection method according to the present invention may be performed with the naked eye. In this case, the method may be used to determine and analyze an abnormal portion of the unit cell according to the present invention. In the defect detection method according to the present invention, the sealed unit cell may be disassembled and a change in color of the unit cell may be checked with the naked eye in order to detect a defect.

At this time, an image of the unit cell may be captured using a digital camera, and a change in color of the unit cell may be analyzed using a predetermined program for convenience of detection.

Those skilled in the art to which the present invention pertains will appreciate that various applications and modifications are possible within the category of the present invention based on the above description.

The invention claimed is:

1. A unit cell comprising:
   a positive electrode;
   a negative electrode; and
   a separator disposed between the positive electrode and the negative electrode,
   wherein the separator comprises a thermochromic polymer, wherein a color of the thermochromic polymer changes depending on temperature,
   wherein the separator comprises a separator substrate, and optionally a coating layer located on at least one surface of the separator substrate,
   wherein the thermochromic polymer is distributed in the entire outer surface of the separator substrate or the coating layer, wherein the thermochromic polymer is obtained by adding a thermochromic dye selected from the group consisting of triphenylmethane colorant, pyridinium phenolate betaine, sulfonephthalein, Reichardt's dye, thyronine, an indicator colorant, 2-chloro-6-dimethyl-amino-3-methylfluoran and mixtures thereof, to a polymer selected from the group consisting of polyethylene, polypropylene, polyester, polyamide, acrylonitrile-butadiene-styrene-copolymer and mixtures thereof.

2. The unit cell according to claim 1, wherein the separator comprises the separator substrate and the coating layer located on at least one surface of the separator substrate, and at least one of the separator substrate or the coating layer comprises the thermochromic polymer.

3. The unit cell according to claim 2, wherein the coating layer has a thickness of 1 μm to 20 μm.

4. The unit cell according to claim 1, wherein the thermochromic polymer is discolored within a temperature range of 60° C. to 120° C.

5. The unit cell according to claim 1, wherein the thermochromic polymer is distributed at a distance of 0 μm to 2 μm from the surface of the separator.

6. The unit cell according to claim 1, wherein the thermochromic polymer is distributed in a surface that faces the positive electrode and a surface that faces the negative electrode.

7. A method for detecting a defect in an unit cell, comprising:

(S1) manufacturing a unit cell, wherein the unit cell comprises a positive electrode; a negative electrode; and a separator disposed between the positive electrode and the negative electrode, wherein the separator comprises a thermochromic polymer, wherein a color of the thermochromic polymer changes depending on temperature; and wherein the thermochromic polymer is obtained by adding a thermochromic dye selected from the group consisting of triphenylmethane colorant, pyridinium phenolate betaine, sulfonephthalein, Reichardt's dye, thyronine, an indicator colorant, an azo pigment, 2-chloro-6-dimethylamino-3-methylfluoran and mixtures thereof, to a polymer selected from the group consisting of polyethylene, polypropylene, polyester, polyamide, acrylonitrile-butadiene-styrene-copolymer and mixtures thereof;

(S2) providing the unit cell in a case and hermetically sealing the case;

(S3) checking for a change in color of the unit cell; and (S4) determining a discolored unit cell to be defective, wherein, in (S3), the change in color of the unit cell is checked through at least one of an ultraviolet measurement or an infrared spectrum measurement.

8. The method according to claim 7, wherein an ultraviolet measurement equipment or an infrared measurement equipment is mounted in the case.

* * * * *